United States Patent
Hori

[11] Patent Number: 5,920,681
[45] Date of Patent: Jul. 6, 1999

[54] SERIAL PRINTER HAVING PRINT DATA PROCESSING UNIT

[75] Inventor: Masaaki Hori, Tajimi, Japan

[73] Assignee: Brother Kogyo Kabushiki Kaisha, Nagoya, Japan

[21] Appl. No.: 08/681,387

[22] Filed: Jul. 23, 1996

[30] Foreign Application Priority Data

Aug. 8, 1995 [JP] Japan .................................. 7-202272

[51] Int. Cl.$^6$ .............................. G06K 1/00; B41J 29/38
[52] U.S. Cl. ......................... 395/105; 395/115; 395/116; 347/5; 347/12
[58] Field of Search ................................... 395/105, 112, 395/114, 115, 102, 117, 110, 109; 347/5, 12, 13, 15, 41, 42, 211

[56] References Cited

U.S. PATENT DOCUMENTS

| | | | |
|---|---|---|---|
| 4,224,869 | 9/1980 | Morin | 101/93.04 |
| 4,386,359 | 5/1983 | Regehr et al. | 346/35 |
| 4,819,556 | 4/1989 | Abe et al. | 400/322 |
| 5,108,207 | 4/1992 | Isobe et al. | 395/115 |
| 5,307,448 | 4/1994 | Matsuyama | 395/112 |
| 5,382,968 | 1/1995 | Endoh | 395/114 |
| 5,467,437 | 11/1995 | Fuse | 395/115 |
| 5,485,178 | 1/1996 | Tateyama et al. | 395/115 |
| 5,487,137 | 1/1996 | Matsuhira | 395/115 |
| 5,610,634 | 3/1997 | Murata et al. | 395/115 |
| 5,627,653 | 5/1997 | Nakazato | 395/114 |
| 5,680,522 | 10/1997 | Kasai | 395/112 |

Primary Examiner—Edward L. Coles
Assistant Examiner—Mark Wallerson
Attorney, Agent, or Firm—Oliff & Berridge, PLC

[57] ABSTRACT

A serial printer having print data processing unit. Print data for one line printing are successively stored in a line buffer. A size of a remaining data storing region is previously set, and the difference between the entire print data numbers for entire one line printing and the received print data numbers is measured. If the difference is equal to or smaller than the size of the remaining data storing region, a transfer commanding portion transmits a command signal to a transfer mechanism, so that operation of the transfer mechanism can be started. During the operation of the transfer mechanism, unstored print data are continuously stored in the line buffer. If all print data have been stored in the line buffer and if the carriage reaches a printing region, printing operation by a print head is started.

23 Claims, 10 Drawing Sheets

SERIAL PRINTER HAVING PRINT DATA PROCESSING UNIT

BACKGROUND OF THE INVENTION

The present invention relates to a serial printer, and more particularly, to a type thereof in which a print device such as a print head is provided for printing image on a printing medium or sheet while the head is moved along the medium.

A Serial printer is known in the art in which the printing device or the sheet moves back and forth, step by step to successive positions, to print one character at a time.

A printer such as an ink jet type printer has an ink ejection head as a printing device and a carriage mounting thereon the head. The ink ejection head and the carriage are movable in a scanning direction or printed character array direction (in a direction parallel with a platen), and a plurality of nozzles are arrayed in a sheet feeding direction (in a direction perpendicular to the scanning direction) in the ink ejection head.

Print data are normally constituted by the data of one line printing through the one scan of the ink ejection head with the ink ejections through the nozzle array. That is, one line printing is performed, through one scan of the head, based on the one line data constituted by the multiplication of a length of the nozzle array by a length of one line. The print data transmitted from a master device such as a host computer are stored in a line buffer at every one line data. When one line data are completely stored in the line buffer, the carriage starts acceleration, and the printing operation is started when the carriage is moved to a moving region where the carriage is moved at a constant velocity. When one line printing operation is completed, the print data is transmitted from the host computer. The operation timing of the host computer and the printing device can be illustrated in the following Table 1:

TABLE 1

| Time | → | | | | | |
|---|---|---|---|---|---|---|
| Host Comp. | Send | | | Send | | |
| Line Buf. | Receive | | Print | Receive | | Print |
| Carriage | Stop | Acc | Move | Dec Stop | Acc | Move |

In the above Table 1, "Acc" and "Dec" stand for acceleration and deceleration of the carriage. As is apparent from the Table 1, the host computer cannot transmit print data to the line buffer when the printing operation is performed. Further, acceleration of the carriage cannot be started until the print data are completely stored in the line buffer. Accordingly, processability of the entire printing system is lower than the mechanical performance of the printing device. In other words, the entire printing system including the printer and the host computer cannot make effective use of the performance of the printer.

If the respective printing period is extremely shorter than the data transmission period, the above described problem does not largely affect the entire printing operation, because the actual printing period does not largely occupy the entire printing operation period. Further, printer can exhibit its efficiency almost perfectly, if other mechanism in the printer is still operated for performing deceleration of the ink ejection head and/or sheet feeding even after the completion of one line printing operation of the printing mechanism, and if data transmission of all print data of the next line from the host computer to the line buffer can be completed during the period of deceleration and sheet feeding process. Therefore, if scale or amount of one line print data is not so large, the above described sequence in Table 1 does not largely affect the entire printing operation.

However, in accordance with the progress of a printer, intricate control is performed in the host computer. Accordingly, amount of data of one line printing is also increased. Thus, the above described problem is becoming into our attention. Particularly, there is a printer, like a dot matrix type printer, capable of printing figures based on a figure data in the host computer. In such a case, the host computer has image data with which the host computer commands printing pattern to the printer. Thus, the amount of data of one line printing is greatly increased. Further, even if the data transmitting period is short, this shortened transmitting period cannot be ignored due to the recent progress in printing speed achieved by the recent printer. The printing period for printing one line is shortened or improved relative to the data transmission period.

In order to overcome the above described drawback, a line buffer has two buffer sections, and each section is alternately used, so that the next line data can be received into one of the buffer sections during one line printing based on the line data stored in the other buffer section. This sequential process will be shown in the following Table 2:

TABLE 2

| Time | → | | | |
|---|---|---|---|---|
| Host Com. | Send | Send | Send | Send |
| 1st Buf. | In | Print | In | Print |
| 2nd Buf. | | In | Print | In |
| Carriage | ST Acc | Move Dec Acc | Move Dec Acc | Move Dec |

In the Table 2 "ST" stands for stop of the carriage, and "In" stands for data storage in the line buffer. Upon completion of storage of the one line print data into the first buffer, printing operation is started based on the one line print data, and at the same time, storage of the subsequent one line print data into the second buffer is started. With this processing, the host computer can continuously transmit line print data, and the printing mechanism of the printer can be controlled to exhibit its maximum printing efficiency.

However, even by the dual line buffer arrangement, if subsequent line print data have a large volume due to the long length of the line after printing precedent line of short length, relatively long stand-by period may be provided until the subsequent line print data are completely stored in one of the buffer sections.

Further, the line buffer must be capable of storing two line printing data, and therefore, large capacity is required in the line buffer. Accordingly, large amount of storage location is required in a RAM for this purpose, which may increase cost of the printing system. In the recent trend, high resolution power is required in the ink jet type printer. This increases the amount of line data, and requires increased capacity of the line buffer, thereby increasing cost of the printer.

SUMMARY OF THE INVENTION

It is therefore, an object of the present invention to overcome the above described drawbacks and to provide an improved serial printer capable of reducing a stand-by period to improve print processing efficiency.

Another object of the present invention is to provide such printer in which reduced data storage capacity is provided to lower the cost of the printer.

These and other objects of the present invention will be attained by a serial printer to be connected to a host computer including printing means, transfer means, receiving means, writable readable data storage means, transfer commanding means, writing means, and print commanding means. The printing means is adapted for forming a printed image on an image recording medium. The transfer means is adapted for moving the printing means along the image recording medium and in a character array direction. The printing means performs one line printing when the printing means is moving in a predetermined printing region with respect to the image recording medium and in one or return moving stroke of the printing means by the transfer means. The receiving means is adapted for receiving print data from the host computer. The writable readable data storage means is adapted for storing therein the print data. The transfer commanding means transmits a command signal to the transfer means so that the operation of the transfer means can be started for starting printing operation in accordance with a print data stored in the storage means in a state where the data storage means has not yet been filled with an entire print data capable of performing a complete one line printing during one or return moving stroke of the printing means. The writing means is adapted for storing the print data received in the receiving means into the storage means. The writing means continues storage of unstored print data to be used for the entire one line printing into the storage means after the start of the operation of the transfer means and during the one or return moving stroke of the printing means. The print commanding means transmits a command signal to the printing means so that the printing means can start printing operation if the one line print data have been filled in the storage means by the time the printing means reaches the predetermined printing region.

In an other aspect, there is provided a print data processing unit for use in a serial printer to be connected to a host computer, the serial printer including printing means for forming a printed image on an image recording medium, and a transfer means for moving the printing means along the image recording medium and in a character array direction, the printing means performing one line printing when the printing means is moving in a predetermined printing region with respect to the image recording medium and in one or return moving stroke of the printing means by the transfer means, the print data processing unit including the above described receiving means, writable readable data storage means, transfer commanding means, writing means and print commanding means.

During the state where the print data transmitted from the host computer are received in the receiving means and stored in the data storage means by the writing means, operation of the transfer means is started even when the all print data to be used in the entire one line printing during one or return moving stroke of the printing means have not yet been stored in the data storage means. At the same time, unstored print data to be used for the entire one line printing are continuously stored in the storage means. If entire print data to be used during one or return moving stroke of the printing means have been stored in the storage means by the time the printing means reaches the predetermined printing region, the printing means starts printing operation. As a result, stand-by period or dead time can be reduced, and print processability can be enhanced.

DETAILED DESCRIPTION OF THE PREFERRED EMBODIMENTS

A serial printer according to one embodiment of the present invention will be described with reference to the drawings. First, a printing mechanism will be described with reference to FIG. 1.

A printing mechanism includes a print head 20, a carriage 21, and moving mechanisms 22 and 24. The print head 20 serves as printing device for printing image on an image recording medium or a sheet 23. The print head 20 is of an ink jet type head in which a plurality of nozzles serving as printing elements are arrayed at equal intervals in the sheet feed direction (Y direction). Ink is ejected from the selected nozzles onto the sheet 23 for forming an inked image thereon. Incidentally, throughout the specification and claims, the term "one line" implies the character array in the X direction formed by one way moving stroke of the print head 20 in the X direction. Therefore, the character array like "ABCDEFG" in FIG. 1 can be referred to as one line, and further, if the print head 20 can simultaneously provide two or more character arrays at the single moving stroke of the print head in the X direction, the latter case is also referred to "one line". This idea is beneficial when considering printing of a large size figure.

Figure 1:
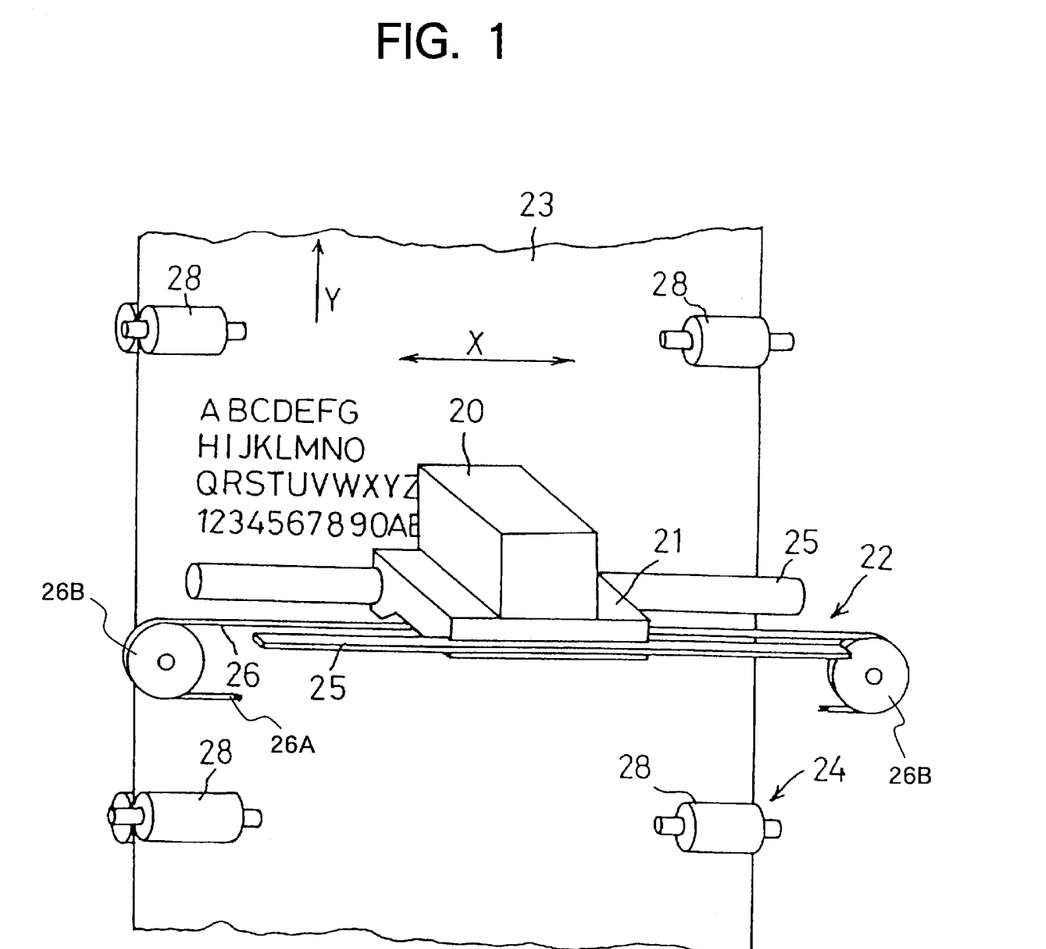
FIG. 1 is a schematic view showing a printing mechanism of a printer according to one embodiment of the invention.

The print head 20 is mounted on the carriage 21 which is moved relative to the sheet 23 by the moving mechanism 22 and 24 in a character array direction (X direction) and a sheet feed direction (Y direction perpendicular to the X direction). The moving mechanism includes a first moving mechanism or a transfer mechanism 22 for moving the carriage reciprocatingly in the character array direction, and a second moving mechanism or a sheet feed mechanism 24 for moving sheet 23 in the sheet feed direction, so that the carriage is relatively moved in the sheet feed direction with respect to the sheet 23.

The transfer mechanism 22 includes guide rails 25, 25, an endless belt-pulley arrangement 26 having an endless belt 26A and pulleys 26B, and a drive motor (not shown). The guide rails 25, 25 is disposed in parallel with the sheet 23 and extend in the character array direction. Along the guide rails 25, 25, the carriage 20 is slidably and reciprocatingly moved. The belt 26A is connected to the carriage 21 and one of the pulleys 26B is connected to the drive motor. The pulley 26B is rotated alternately in one and reverse direction, so that the carriage 21 is moved reciprocatingly through the belt 26A. The sheet feed mechanism 24 includes rollers 28 whose rotation axes extends in the character array direction and disposed in parallel with the sheet 23, and drive motor (not shown) for driving these rollers 28.

Figure 2:
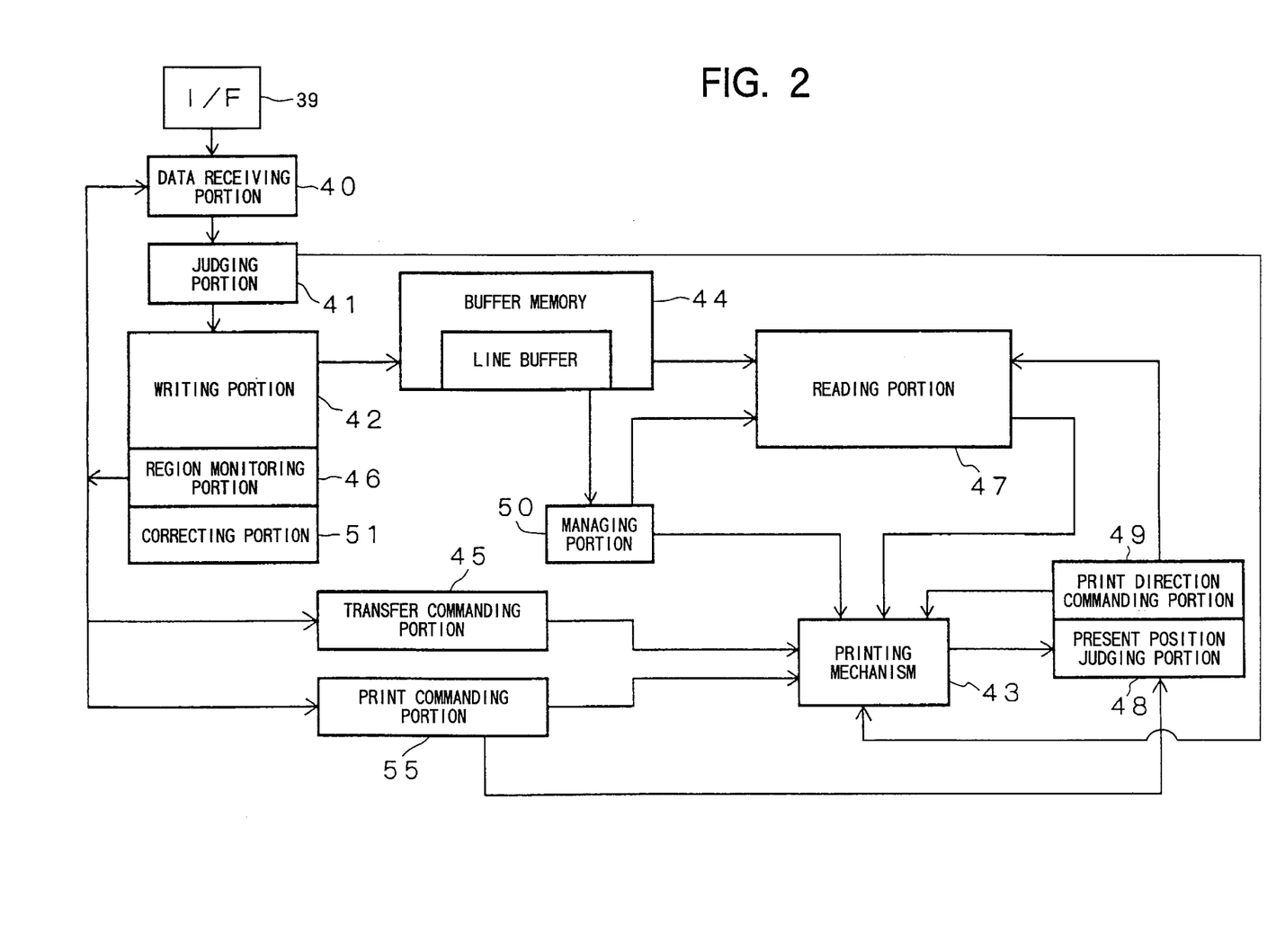
FIG. 2 is a block diagram showing a print data processing unit according to a first embodiment of the present invention.

An essential circuitry arrangement or a control circuit according to the first embodiment of the present invention is shown in a block diagram of FIG. 2. The control circuit generally includes a central processing unit (CPU), storage means or ROM for storing therein a control program, and writable readable data storage means or RAM.

A data receiving portion 40 is provided for receiving various data from a personal computer through an interface (I/F) 39. A judging portion 41 is connected to the data receiving portion 40 for making judgment as to whether the data received is print data or control data which controls a printing mechanism 43. Thus, the judging portion 41 is connected to the writing portion 42 and the printing mechanism 43. If the judgment falls the print data, the data are transmitted to the writing portion 42, and if the data is the control data, the latter is transmitted to the printing mechanism 43.

The writing portion 42 is connected to a buffer memory 44 of the writable readable data storage means, and is adapted to create in the buffer memory 44 a memory region as a line buffer for storing therein one line print data when the print data is received in the writing portion 42 from the judging portion 40. The received print data such as image data are successively stored in the line buffer. The buffer memory 44 has a capacity capable of storing therein a maximum one line print data but incapable of storing therein two line print data. For example, the buffer memory 44 has a capacity capable of storing 1.5 line print data. More specifically, the buffer memory 44 has a capacity greater than a capacity capable of storing a maximum print data for one line printing with one transfer operation of the transfer mechanism 22 but smaller than a capacity capable of storing maximum print data for two line printing with twice transfer operation of the transfer mechanism 22. Therefore, unwanted stand-by period can be reduced, yet data storage capacity is smaller than that of a conventional two line buffer system, to thereby lower the cost of the printer.

A region monitoring portion 46 is provided for counting the received print data numbers (rcvdata←rcvdata+1) and for comparing the size or capacity (remdata) of a preset remaining data region with the difference between the counted print data numbers and a maximum print data numbers for one line printing (entire print data numbers for one line printing). Further, if the difference is equal to or smaller than the capacity of the preset remaining data region, this fact is alarmed to a transfer commanding portion 45 from the region monitoring portion 46. Further, the region monitoring portion 46 is adapted for checking as to whether the counted print data numbers reaches the entire print data numbers i. e., for checking as to whether or not one line print data are completely counted. If the latter is the case, the region monitoring portion 46 alarms to a print commanding portion 55 about completion of the count of the entire print data numbers. Furthermore, the region monitoring portion 46 is adapted to find an empty region with respect to the entire area of the buffer memory 44, and is adapted to command to the data receiving portion 40 about the interruption of the data reception if there is no empty region in the buffer memory 44.

A correcting portion 51 is provided for correcting the size or capacity of the remaining data region (remdata). This correction is made manually or by the manner described later.

The transfer commanding portion 45 is adapted to command to a reading portion 47 in response to the alarm signal transmitted from the region monitoring portion 46 to the transfer commanding portion 45, so that the reading portion 47 reads the print data from the line buffer, and so that the movement of the carriage of the printing mechanism is started. Accordingly, a present position judging portion 48 judges the present position of the carriage, i.e., the present position of the print head 20, and a print direction commanding portion 49 judges the printing direction for one line based on the present position of the print head 20 and a position of a line to be printed. Thus, the present position judging portion 48 commands to the carriage 21 as to its moving direction, and the print direction commanding portion 49 commands to the reading portion 47 as to the reading direction of the line print data in the line buffer. The function as to the moving direction of the carriage and data reading direction is known from a conventional bidirectional minimum distance printing control.

The print commanding portion 55 commands to the print head 20 as to the start of the printing in accordance with a signal from the present position judging portion 48 when the carriage is moved to a predetermined printing region.

Figure 3:
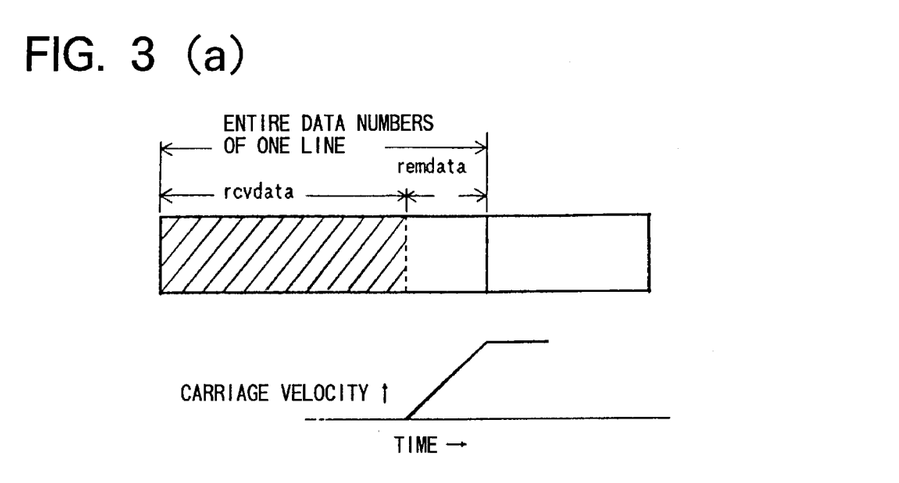
FIGS. 3(a) through 3(f) are schematic views showing the relationship between print data storage mode and the movement of a print head according to the first embodiment.

Print data storage manner into the buffer memory and operation of the carriage are schematically shown in FIG. 3. Further, a control routine is shown in a flowchart of FIG. 4. In the depicted embodiment, the print data transmitted from the host computer are so called columnar scan image data. That is, print data of one dot array in the sheet feed direction (columnar direction) are successively transmitted and stored by a unit of one byte. Further, in the depicted embodiment, the one dot array in the columnar direction contains 60 dots, i. e., 60 nozzles are aligned in the columnar direction, and there are 2880 dots in the character array direction in one line printing. Furthermore, the buffer memory has a capacity of 32 K byte, and 400 ms is required for data retrieval for operating one line printing, and acceleration and deceleration period of the carriage 21 is 50 ms.

Figure 4:
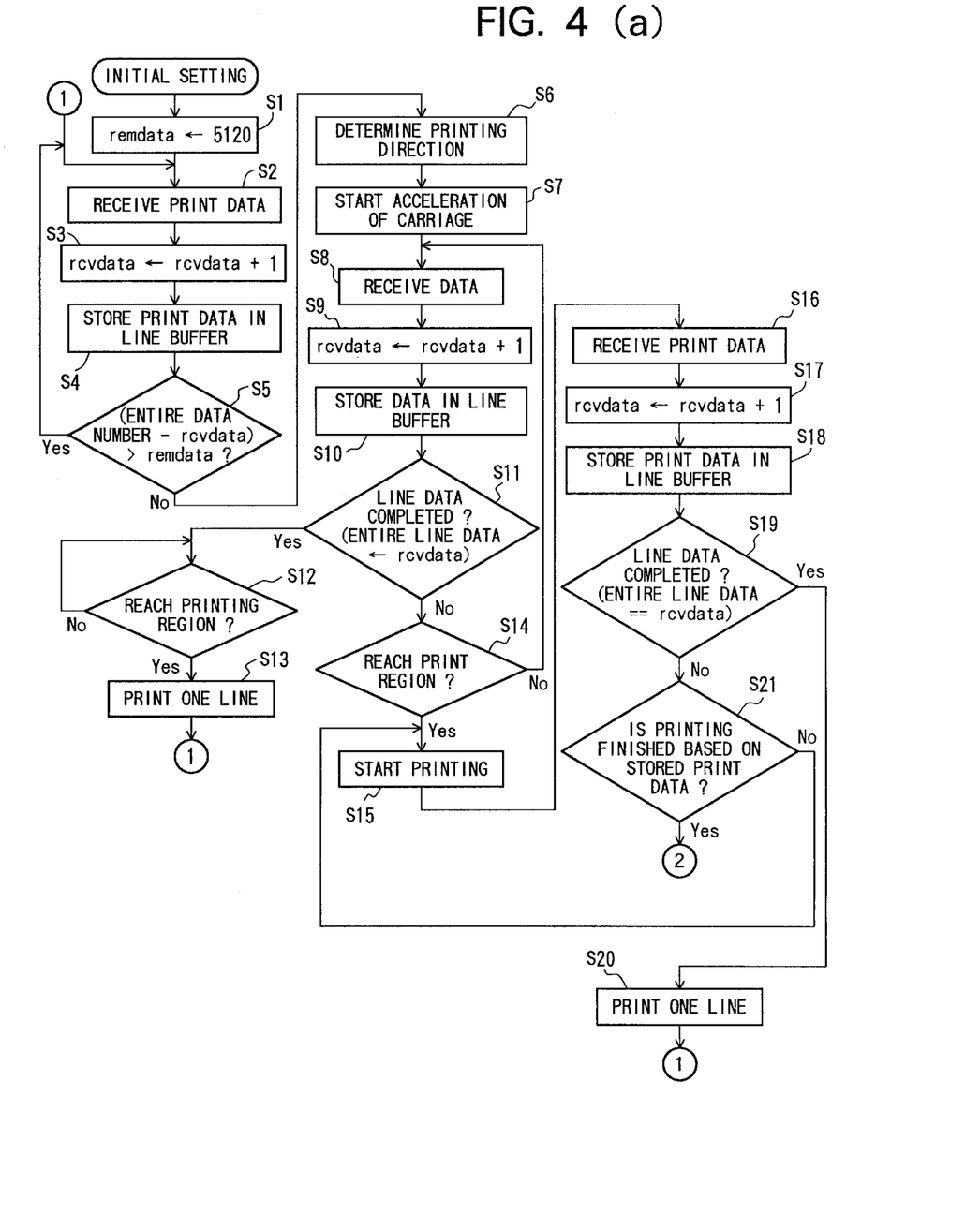
FIGS. 4(a) and 4(b) are flowcharts showing a print data processing routine according to the first embodiment.

In FIG. 4, after electrical power supply and an initial setting is performed, in Step S1, the remaining data region numbers (remdata) is established to 5120 bytes. This byte numbers is print data numbers capable of being stored in the line buffer during acceleration or deceleration period of the carriage 21, taking the maximum transferring efficiency of 100 K bytes/Sec. of a parallel interface of an ordinary printer into consideration. When the writing portion 42 receives the print data (S2), the region monitoring portion 46 will count the print data numbers (rcvdata–rcvdata+1) in S3, and the print data are stored in the line buffer (S4).

Then in step S5, judgment is made in the region monitoring portion 46 as to whether or not the difference between the entire data numbers (60×2880=21600) and the received data numbers (rcvdata) is equal to or smaller than the remaining data region (remdata). For example, as shown in FIG. 3(a), if the print data by the amount of hatching portion are stored while remaining remaining data region (remdata), the judgment falls that the difference is smaller than the received data numbers (S5:No). Therefore, the routine notes into step S6 where the transfer commanding portion 45 transmits command signal to the print direction commanding portion 49, so that the print direction commanding portion 49 determines the moving direction of the carriage 21, i.e, printing direction. Then in Step S7, acceleration of the carriage is started.

In this connection, the steps S5 through S7 comprises means for judging a predetermined amount of print data stored by the writing portion 42 into the data storage portion 44 and used for the one line printing with the one or return moving stroke of the printing mechanism 43. The transfer commanding portion starts operation of the transfer mechanism 22 if the judging means judges that the predetermined amount of the print data have been stored in the data storage portion or the buffer memory 44. Accordingly, operation of the transfer mechanism 43 can surely be started on the basis of the amount of the print data stored in the buffer memory 44 even before the complete storage of the entire one line print data.

The writing portion 42 continues data reception even during acceleration of the carriage 21 (S8), and the print data are stored in the remaining data region (remdata) in Steps S9 and S10. If print data are received at the maximum speed from the host computer without obstruction, unstored print data can be stored into the remaining data storing region (remdata) within the acceleration period of 50 ms. As a result, as shown in FIG. 3(b), print data of one line can be stored in the line buffer (S11:Yes). In this case, print commanding portion 55 transmits a command signal to the printing mechanism 43, so that the first line printing operation can be started (S13) provided that the carriage moves at its constant velocity and reaches the printing region on the printing sheet 23 (S12:Yes).

During this printing operation, as shown in FIG. 3(b), the writing portion 42 will start writing data of a next or second line at a memory area (nxtdata) having a capacity capable of storing 0.5 line print data, the memory area being other than the line buffer in the buffer memory 44 by way of the steps S2 through S4. The memory area has a capacity of 32×1024−21600=11168 bytes. If the memory area (nxtdata) is filled with the print data, the region monitoring portion 46 transmits a command signal to the receiving portion 40, so that the receiving portion 40 will stop data receipt until the first line printing operation is completed.

When the first line printing is completed, as shown in FIG. 3(c), the writing portion 42 writes the rear half data of the next line from the top data into a vacant region of the line buffer during the deceleration period of 50 ms of the carriage 21 by way of the steps S2 through S4. During the deceleration, the data amount of 5120 bytes can be stored in the line buffer. The amount of the rear half print data is 10432 bytes (216000−11168=10432), and therefore, amount of print data to be stored is rather small (10432−5120=5312 bytes). Taking the amount of print data (remdata) to be stored in the next acceleration period into consideration, after the carriage stopping for a limited period, the received print data will occupy the remaining data storing region (S5:No). The "limited period" is required so as to store print data of 92 bytes, because print data of 5120 bytes are stored during the subsequent acceleration period, and therefore, the data of 92 bytes (5312−5120=92) must be stored in the stopping period of the carriage. Then, as described above, the transfer commanding portion 45 transmits a command signal to the printing mechanism 43, so that acceleration of the carriage can be started (S6, S7).

Similar to the foregoing procedure, during the acceleration of the carriage, the print data of the second line is stored in the remaining data storing region (remdata) through the steps S8, S9, S10 and S11:Yes), and second line printing operation is performed in the steps S12 and S13.

During the second line printing operation, storage of the print data for the third line into the vacant area (nxtdata) of the buffer memory is started by way of the steps S2 through S4. When the second line printing operation is completed, as shown in FIG. 3(d), subsequent print data for the third line is stored in the vacant area of the buffer memory during deceleration and acceleration of the carriage in a manner similar to the above process by way of the steps S2 through S11. When the third line printing operation is started as shown in FIG. 3(e), storage of the print data for the fourth line into the front vacant area of the buffer memory is started by way of the steps S2 through S4. When the third line printing operation is completed, as shown in FIG. 3(f), subsequent print data for the fourth line is stored, so that the state shown in FIG. 3(a) is provided.

The above described steps in connection with the operation of the host computer and the printer can be represented in a time chart of the following Table 3:

TABLE 3

| Time  | →          |            |            |            |
|-------|------------|------------|------------|------------|
| Host  | Send Send  | Send Send  | Send Send  | Send Send  |
| Buff  | Print      | Print      | Print      | Print      |
|       | In In      | In In      | In In      | In In      |
| Carr. | ST Acc     | Move Dec Acc | Move Dec Acc | Move Dec Acc Move |

If the carriage reaches the printing region while line print data is not completely stored in the line buffer (S11: No, and S14: Yes) because of the reason that print data transmission from the host computer is delayed due to obstruction, the print commanding portion 55 transmits a command signal to the printing mechanism 43, so that the printing is started based on the stored print data (S15). Further, the writing portion 42 continues data reception and storage into the line buffer by way of the steps S16 through S18. In the illustrated embodiment, columnar scan data are used, print data can be added to the non printing data region. If one line print data are created in the line buffer during the printing operation (S19: Yes), printing can be performed until the end of the one line print data (S20).

That is, in case of using the columnar scan data, the printing mechanism 43 performs printing operation based on the already stored print data stored in the buffer memory 44, while, at the same time, the writing portion 42 continues storage of the unstored print data for the one line printing into the buffer memory 44. Thus, print processing ability can be enhanced by way of the steps S15 through S21.

If all the stored print data are used for printing operation in spite of the fact that all one line print data has not yet been stored in the line buffer (S19: No, and S21: Yes), the carriage deceleration is started for stopping the carriage, and the print head is also stopped. Then, as a next operation, the remaining print data are received and stored (S31 through S33) in a manner similar to the above steps, and when the remaining print data to the line end has been stored (S34:Yes), the carriage is accelerated (S35) and printing operation is performed (S36) without changing the line position.

That is, printing mechanism 43 performs printing operation for printing a remaining portion of the one line printing at the next operation of the transfer mechanism 22, if the printing mechanism completes printing operation based on the already stored print data stored in the buffer memory 44 and if there are unstored print data to be used for the one line printing. In other words, if one line printing operation is terminated in spite of the fact that all one line print data have not yet been stored in the buffer memory 44, the unprinted portion in the identical line can be printed in the subsequent printing operation based on the unstored print data. Therefore, print processing ability can further be improved, and print-impossible state can be obviated. Thus, all print data to be used during one or return stroke of the print head for one line printing can be used during a single stroke of the print head by way of the steps S31 through S36.

Incidentally, if the one line print data contain the maximum print data size capable of being printed in one line, a minute stopping period may be provided in the carriage as described above. However, in reality, left or right margin data or no print data or space data are often present, and therefore, the stopping period can be neglected. Further, in the illustrated embodiment, the next line print data are stored successively from the preceding line print data in the buffer memory, and circulating data storage is performed such that if the data storage reaches the final address, the data are then stored in the top address. A managing portion 50 is adapted for registering a position of the line stored in the buffer memory so as to manage a line base management in case of the data retrieval.

Figure 5:
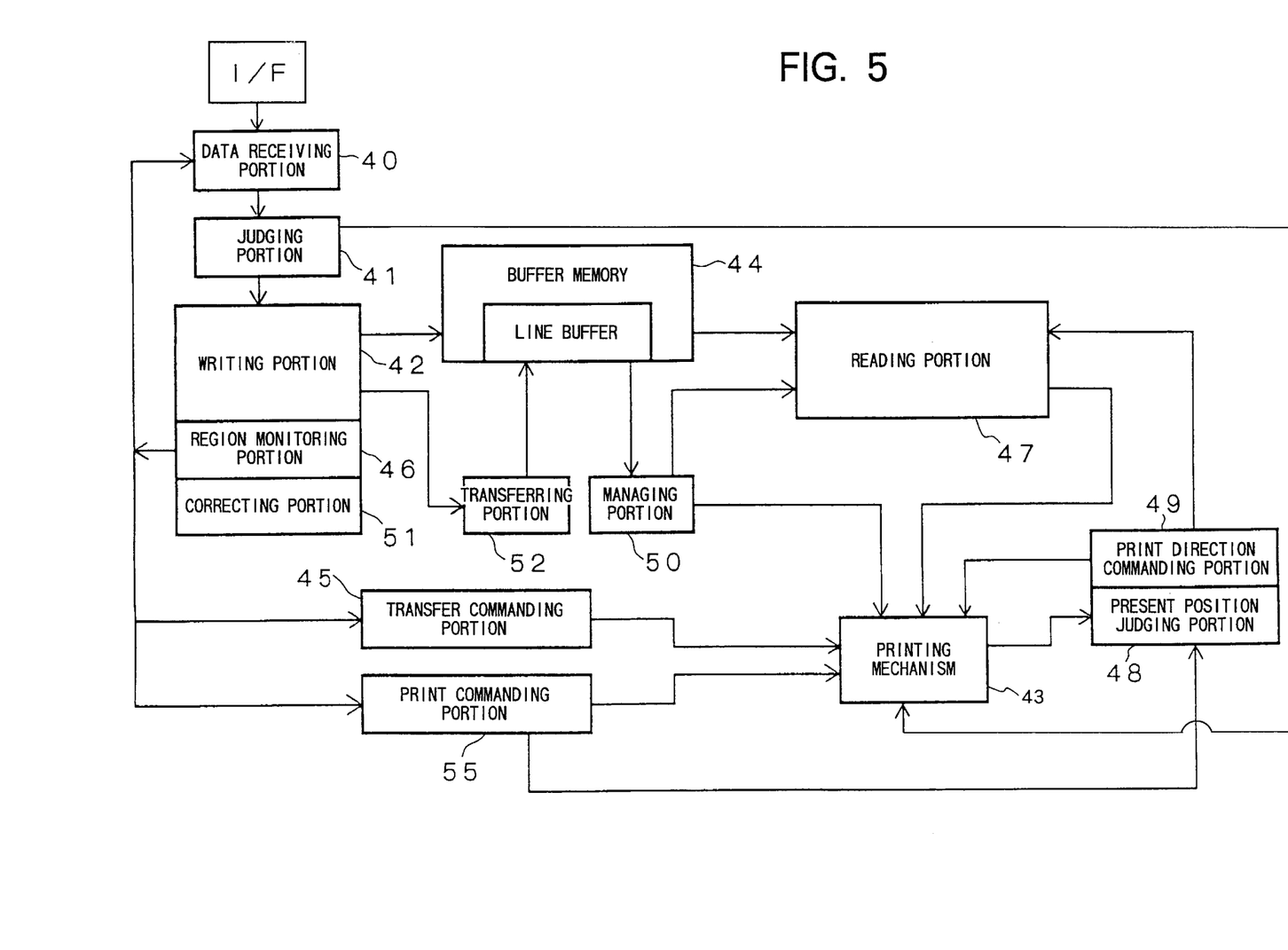
FIG. 5 is a block diagram showing a print data processing unit according to a second embodiment of the present invention.
Figure 6:
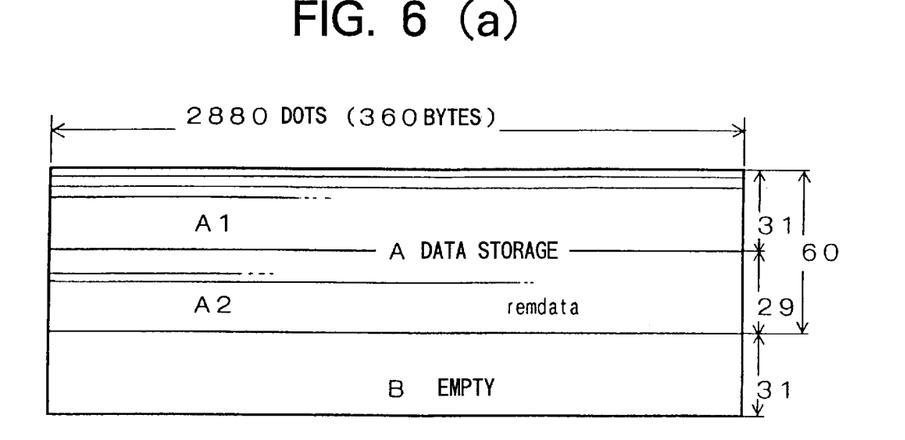
FIGS. 6(a) through 6(c) are schematic views showing print data storage mode according to the second embodiment.

An essential circuitry arrangement or a control circuit according to a second embodiment of the present invention is shown in FIG. 5. Further, print data storage manner into the buffer memory and operation of the carriage according to the second embodiment are schematically shown in FIG. 6. Furthermore, a control routine according to the second embodiment is shown in a flowchart of FIG. 7. In the second embodiment, the print data transmitted from the host computer are so called raster scan image data. That is, print data of first dot line in the character array direction are successively transmitted by a unit of one byte, and upon completion of transmission of the data of the first dot line, print data of second dot line in the character array direction are transmitted.

A buffer memory has a capacity of 32 K bytes, and the memory location is divided into a plurality of blocks as shown in FIG. 6. The region or block A serves as a line buffer having a capacity of 21600 bytes which is a size of one line print data (2880×60 dots=21600 bytes) used for one printing operation. The remaining region B serves as a temporary data storing region. The region B has a buffer region capable of storing 31 rasters {(32×1024−21600)/360=31}.

The region A is divided into two sections A1 and A2. The upper section A1 is divided into 31 rasters, and the lower section A2 is divided into 29 rasters. The raster size of the upper section A1 is equal to that of the region B. As described later, the region B is adapted to store one line print data in co-operation with about half size of the region A. Therefore, the region B has a capacity half the region A.

Figure 7:
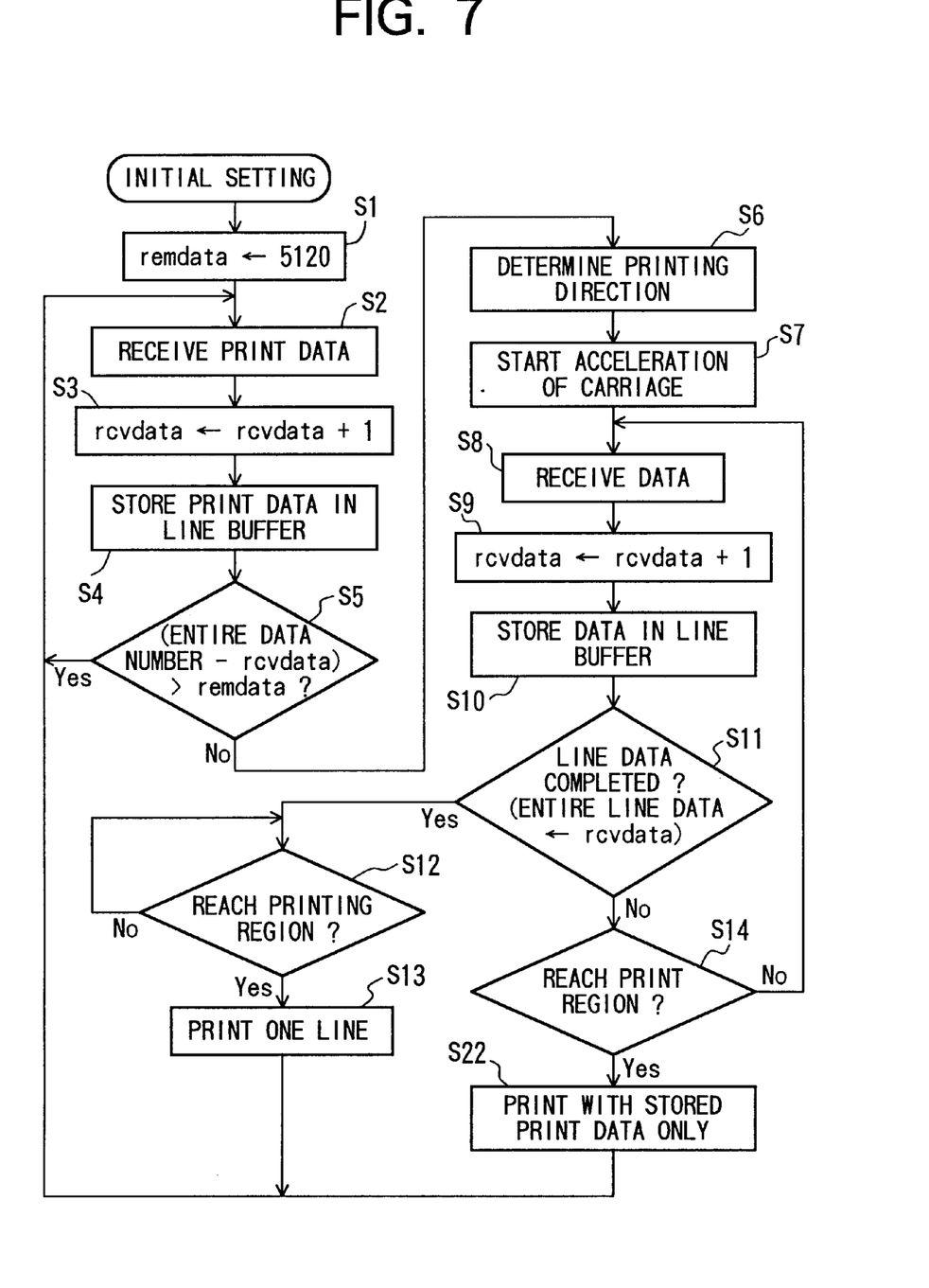
FIG. 7 is a flowchart showing a print data processing routine according to the second embodiment.

In FIGS. 5 and 7, like part and steps are designated by the same reference numerals and step numbers as those shown in FIGS. 3 and 4. In the control circuit of the second embodiment, a transferring portion 52 is further provided for transferring print data stored in the buffer memory between the two regions thereof.

In an initial state, both regions A and B are empty. If print data are received in the receiving portion 40, the writing portion 42 stores successively the print data into the region A from the first raster to the 60th raster by way of the steps S1 through S4 as shown in FIG. 6(a).

In the second embodiment, the remaining data storing area is set to 14 rasters. Therefore, if 47 rasters have been stored in the region A, the judgment in the step S5 falls No, so that the similar to the first embodiment, the transfer commanding portion 45 transmits a command signal to the printing mechanism so that the acceleration of the carriage can be started so as to start printing operation (S6, S7). On the other hand, through the steps S8 through S10, print data reception and storage are continued. During the acceleration of the carriage, if the 60 rasters have been stored (S11;Yes), the print commanding portion 55 transmit command signal to the printing mechanism so that the printing can be started (S13) after the carriage is moved at its constant velocity and reaches the printing area (S12: Yes).

Concurrent with the start of the printing operation, the writing portion 42 starts storage of the next line print data by the amount of 31 rasters in the region B (S2 through S4) as shown in FIG. 6(b). It is possible to store print data of 31 rasters during the first line printing operation. When the printing operation in accordance with the print data stored in the region A is completed, the transferring portion 52 transfers the print data stored in the region B to the region A1 during deceleration period of the carriage. Then, the writing portion 42 stores the succeeding second line data into the region A2.

As a result, if the print data are stored so that the data are stored in the remaining data storing region (remdata) as shown in FIG. 6(a)(S5: No), the carriage is accelerated (S6, S7) for starting the second line printing operation, and then the same steps are repeated. When the 29th raster is stored in the region A2, a minute carriage stopping period may be provided between acceleration and deceleration. However, this stopping period can be neglected.

In the second embodiment, if the print data transmission from the host computer is delayed due to obstruction, and if the carriage reaches the printing area while the line buffer is not filled with the entire line print data (S14: No), the print commanding portion 55 transmits a command signal to the printing mechanism so that the printing will be started based on the already stored print data only (S22). Then the routine returns back to the step S2 so that remaining unstored print data will then be stored in the buffer memory. Then, the upper rasters for the next line are stored following the storage of the remaining print data in order to perform printing in the above described manner.

To be more specific, if print data of 58th to 60th rasters have not yet been stored in the buffer memory when the carriage reaches the print start position in S22, the printing will be started in accordance with the first to 57th rasters during one moving stroke of the carriage. Thus, the lower or bottom portion of the resultant printed image is lacking in S22. For the print data storage in S2 after S22, unstored 58th to 60th rasters will be first to 3rd rasters for the next line printing, and print data which should have been first and subsequent rasters for the next line printing will be the fourth and subsequent rasters in the print data storage in S2.

Alternatively, independent printing may be achieved with respect to the remaining print data similar to the steps S31 through S36 shown in FIG. 4(b).

In the second embodiment, raster scan data are employed, the top end and trailing end portion of the line can be acknowledged irrespective of the complete storage of the line print data. Therefore, the print direction commanding portion 49 can effectively use the above described bidirectional minimum distance printing control.

Figure 8:
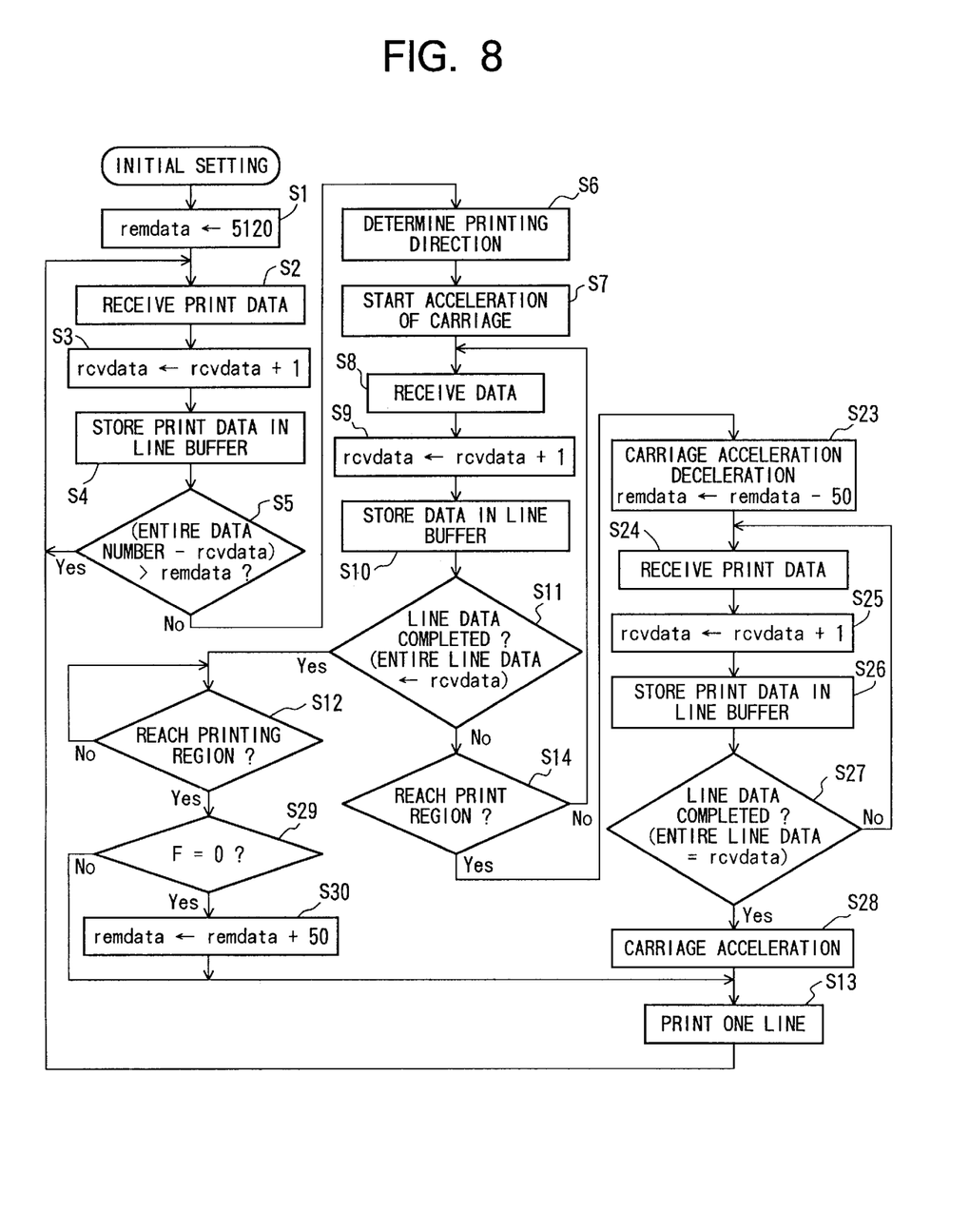
FIG. 8 is a flowchart showing a print data processing routine according to a third embodiment.

A print control according to a third embodiment of the present invention will be described with reference to a flowchart shown in FIG. 8, wherein like step numbers are designated by the same step numbers as those shown in FIG. 4.

In the third embodiment, if printing operation is carried out while the print data are normally transmitted from the host computer at high speed, above described steps are correspondingly available. On the other hand, if the carriage reaches the printing region (S14:Yes) while the line buffer is not filled with the entire line print data (S11: No), the transfer commanding portion 45 decelerates the carriage and stops the carriage (S23). At the same time, the correcting portion 51 reduces the size of the remaining data storing region (remdata–remdata–50). Then, the data storage is performed until the remaining print data for one line are stored (S24 through S27). That is, print data reception is performed in S24, and print data numbers are counted in S25, and print data are stored in the line buffer in S26. When the one line print data are stored(S27:Yes), the carriage is again accelerated (S28), and line printing is performed (S13).

Therefore, when the next line is to be printed, acceleration of the carriage is started (S6, S7) after the increased amount of print data (rcvdata) have been stored (S5: No). Accordingly, amount of print data to be stored during the acceleration period can be reduced. Consequently, can be reduced a probability of reaching the carriage to the printing region (S14:Yes) while the line buffer has not yet been filled with the line print data (S11:No). Nevertheless the carriage reaches the printing region while the line buffer is not filled with the one line print data, the carriage is again stopped, and size of the remaining data storing region is again reduced (remdata–remdata–50).

On the other hand, if the carriage reaches the printing region (S12:Yes) after the line buffer is filled with the print data (S11: Yes), the correcting portion 51 will enlarge the remaining data storing region (remdata–remdata+50) in step S30.

If the size of the remaining data storing region is reduced in the previous printing, or if the remaining data storing region is to be reduced after the enlargement of the remaining data storing region, a flag F sets "1" in S23, and thereafter, after the line buffer is filled with the print data (S11:Yes), the routine proceeds into step S29, where judgment is made as to whether or not the size of the remaining data storing region is expanded. Since the size of the remaining data storing region is reduced, the routine goes around the step S30 in order to avoid expansion of the remaining data storing region.

In this way, proper size is established with respect to the remaining data storing region (remdata) in accordance with the acceleration period of the printing device. Accordingly optimum print control can be conducted. That is, the transfer mechanism can have its optimum drive start timing.

While the invention has been described in detail and with reference to specific embodiment thereof, it would be apparent to those skilled in the art that various changes and modifications may be made therein without departing from the spirit and scope of the invention.

For example, in the illustrated embodiment, acceleration of the carriage is started as a result of the judgment of the size of the remaining print data storing region. However, this acceleration start can be provided as a result of the measurement of time. For instance, time measurement is started when the storage of the one line print data is started, and in the step S5, judgment is made as to whether or not a predetermined period has passed. In this case, the correcting portion 51 is adapted for correcting the predetermined period. In this connection, the steps S5 through S7 comprise means for judging a predetermined time period starting from the storage of the print data into the buffer memory 44 by the writing portion 42, the print data being used for the one line printing with the one or return moving stroke of the printing mechanism 43. The transfer commanding portion 45 starts operation of the transfer mechanism 22 if the judging means judges that the predetermined time period has been elapsed.

Further, in the above described embodiments, the first and second moving mechanisms 22 and 24 are adapted to move the print head 20 in the character array direction and to move the sheet in the sheet feed direction, respectively. However, The first and second moving mechanisms can be used to move the sheet in the character array direction and to move the print head 20 in the sheet feed direction. In any event the moving mechanism is adapted to provide relative movement of the print head 30 with respect to the sheet 23 in the X- and Y-directions.

Further, in the illustrated embodiment the ink jet type print head 20 is used, which can provide high resolution power. However, can be used a dot matrix type print head such as a dot impact type print head using a plurality of print hammer wires and a thermal head using a plurality of heat generating elements.

What is claimed is:

1. A serial printer to be connected to a host computer comprising:

a printing device that forms a printed image on an image recording medium;

a transfer device that moves the printing device along the image recording medium and in a character array direction, the printing device performing one line printing when the printing device is moving in a predetermined printing region with respect to the image recording medium and in one or return moving stroke of the printing device by the transfer device;

a receiving device that receives print data from the host computer;

a writable readable data storage unit that stores the print data;

a transfer commanding device that transfers a command signal to the transfer device so that the operation of the transfer device can be started for starting printing operation in accordance with a print data stored in the storage unit in a state where the data storage unit has not yet been filled with an entire print data capable of performing a complete one line printing during one or return moving stroke of the printing device;

a writing device that stores the print data received in the receiving device into the storage unit, the writing device continuing storage of unstored print data to be used for the entire one line printing into the storage unit after the start of the operation of the transfer device and during the one or return moving stroke of the printing device; and a print commanding device that transmits a command signal to the printing device so that the printing device can start printing operation if either the one line print data have been filled in the storage unit by the time the printing device reaches the predetermined printing region or the print data for the complete one line printing has not been filled in the data storage unit;

a judging device that judges a predetermined amount of print data stored by the writing device into the data storage unit and used for the one line printing with the one or return moving stroke of the printing device, the predetermined amount being less for a data amount for one line of printing, the transfer commanding device starting operation of the transfer device if the judging device judges that the predetermined amount of the print data have been stored in the data storage unit.

2. The serial printer as claimed in claim 1, wherein the print data comprise columnar scan data;

and wherein the writing portion continuously stores unstored print data to be used for the one line printing into the data storage unit until the printing device completes printing operation based on the print data already stored in the data storage unit.

3. The serial printer as claimed in claim 2, wherein the printing device performs printing operation for printing a remaining portion of the one line printing at a next operation of the transfer device, if the printing device completes printing operation based on the already stored print data stored in the data storage unit and if there are unstored print data to be used for the one line printing.

4. The serial printer as claimed in claim 1, wherein the print data comprise raster scan data;

and wherein the writing portion continuously stores unstored print data to be used for the one line printing into the data storage unit until the printing device completes printing operation based on the print data already stored in the data storage unit.

5. The serial printer as claimed in claim 4, wherein the printing device performs printing operation for printing a remaining portion of the one line printing at a next operation of the transfer device, if the printing device completes printing operation based on the already stored print data stored in the data storage unit and if there are unstored print data to be used for the one line printing.

6. The serial printer as claimed in claim 5, further comprising a determining device that determines printing direction in accordance with the predetermined amount of print data stored in the data storage unit, when the transfer commanding device transmits the command signal to the transfer device for starting the operation of the transfer device.

7. The serial printer as claimed in claim 1, wherein the transfer commanding device stops operation of the transfer device if all print data for the one line printing through one or return stroke of the printing device have not yet been stored in the data storage unit by the time the printing device reaches the printing position for printing in accordance with the already stored print data stored in the data storage unit, and the transfer commanding device starts operation of the transfer device when the all print data for the one line printing have been stored in the data storage unit.

8. The serial printer as claimed in claim 7, further comprising a correcting device that corrects a command timing at which the transfer commanding device starts operation of the transfer device.

9. The serial printer as claimed in claim 8, wherein the correcting device corrects the command timing in accordance with a timing at which the printing device reaches the predetermined printing region and a timing at which all print data for the one line printing have been stored in the data storage unit in the transfer operation in one moving stroke of the printing device.

10. The serial printer as claimed in claim 1, wherein the data storage unit stores print data for at least one line of printing during the one or return moving stroke of the transfer device but less than two lines of printing during the one or return moving stroke of the transfer device.

11. The serial printer as claimed in claim 1, wherein the printing device comprises an ink jet type print head.

12. The serial printer as claimed in claim 1, further comprising a judging device that judges a predetermined time period starting from the storage of the print data into the data storage unit by the writing device, the print data being used for the one line printing with the one or return moving stroke of the printing device, the transfer commanding device starting operation of the transfer device if the judging device judges that the predetermined time period has been elapsed.

13. A print data processing unit for use in a serial printer to be connected to a host computer, the serial printer including a printing device that forms a printed image on an image recording medium, and a transfer device that moves the printing means along the image recording medium and in a character array direction, the printing device performing one line printing when the printing device is moving in a predetermined printing region with respect to the image recording medium and in one or return moving stroke of the printing device by the transfer device, the print data processing unit comprising:

a receiving device that receives print data from the host computer;

a writable readable data storage unit that stores the print data;

a transfer commanding device that transmits a command signal to the transfer device so that the operation of the transfer device can be started for starting printing operation in accordance with a print data stored in the storage unit in a state where the data storage unit has not yet been filled with an entire print data capable of performing a complete one line printing during one or return moving stroke of the printing device;

a writing device that stores the print data received in the receiving device into the storage unit, the writing device continuing storage of unstored print data to be used for the entire one line printing into the storage unit after the start of the operation of the transfer device and during the one or return moving stroke of the printing device; and a print commanding device that transmits a command signal to the printing device so that the printing device can start printing operation if either the one line print data have been filled in the storage unit by the time the printing device reaches the predetermined printing region or the print data for the complete one line printing has not been filled in the data storage unit;

a judging device that judges a predetermined amount of print data stored by the writing device into the data storage unit and used for the one line printing with the one or return moving stroke of the printing device, the transfer commanding device starting operation of the transfer device if the judging device judges that the predetermined amount of the print data have been stored in the data storage unit.

14. The print data processing unit as claimed in claim 13, wherein the print data comprise columnar scan data;

and wherein the writing portion continuously stores unstored print data to be used for the one line printing into the data storage unit until the printing device completes printing operation based on the print data already stored in the data storage unit.

15. The print data processing unit as claimed in claim 14, wherein the printing device performs printing operation for printing a remaining portion of the one line printing at a next operation of the transfer device, if the printing device completes printing operation based on the already stored print data stored in the data storage unit and if there are unstored print data to be used for the one line printing.

16. The print data processing unit as claimed in claim 13, wherein the print data comprise raster scan data;

and wherein the writing portion continuously stores unstored print data to be used for the one line printing into the data storage unit until the printing device completes printing operation based on the print data already stored in the data storage unit.

17. The print data processing unit as claimed in claim 16, wherein the printing device performs printing operation for printing a remaining portion of the one line printing at a next operation of the transfer device, if the printing device completes printing operation based on the already stored print data stored in the data storage unit and if there are unstored print data to be used for the one line printing.

18. The print data processing unit as claimed in claim 17, further comprising a determining device that determines printing direction in accordance with the predetermined amount of print data stored in the data storage unit, when the transfer commanding device transmits the command signal to the transfer device for starting the operation of the transfer device.

19. The print data processing unit as claimed in claim 13, wherein the transfer commanding device stops operation of the transfer device if all print data for the one line printing through one or return stroke of the printing device have not yet been stored in the data storage unit by the time the printing device reaches the printing position for printing in accordance with the already stored print data stored in the data storage unit, and the transfer commanding device starts operation of the transfer device when the all print data for the one line printing have been stored in the data storage unit.

20. The print data processing unit as claimed in claim 19, further comprising a correcting device that corrects a command timing at which the transfer commanding device starts operation of the transfer device.

21. The print data processing unit as claimed in claim 20, wherein the correcting device corrects the command timing in accordance with a timing at which the printing device reaches the predetermined printing region and a timing at which all print data for the one line printing have been stored in the data storage unit in the transfer operation in one moving stroke of the printing device.

22. The print data processing unit as claimed in claim 13, wherein the data storage means stores print data for at least one line of printing during the one or return moving stroke of the transfer means but less than two lines of printing during the one or return moving stroke of the transfer device.

23. The print data processing unit as claimed in claim 13, further comprising a judging device that judges a predetermined time period starting from the storage of the print data into the data storage unit by the writing device, the print data being used for the one line printing with the one or return moving stroke of the printing device, the transfer commanding device starting operation of the transfer device if the judging device judges that the predetermined time period has been elapsed.

* * * * *